United States Patent
Terrell

(10) Patent No.: US 7,147,203 B2
(45) Date of Patent: Dec. 12, 2006

(54) FLUID CONTROL

(76) Inventor: Christopher Terrell, 4 Oakdale Road, Tunbridge Wells, Kent TN4 8DS (GB)

( * ) Notice: Subject to any disclaimer, the term of this patent is extended or adjusted under 35 U.S.C. 154(b) by 63 days.

(21) Appl. No.: 10/964,558

(22) Filed: Oct. 13, 2004

(65) Prior Publication Data

US 2005/0155656 A1     Jul. 21, 2005

(30) Foreign Application Priority Data

Oct. 14, 2003  (GB) ................................. 0324020.7
Mar. 11, 2004  (GB) ................................. 0405423.5

(51) Int. Cl.
*F16K 11/20*   (2006.01)

(52) U.S. Cl. ................. 251/121; 137/606; 137/625.33; 138/46; 251/343

(58) Field of Classification Search ............ 137/625.3, 137/606, 607; 251/117, 118, 121, 343; 138/46
See application file for complete search history.

(56) References Cited

U.S. PATENT DOCUMENTS

| | | | | |
|---|---|---|---|---|
| 2,891,761 A | * | 6/1959 | McCarty ...................... | 251/62 |
| 3,025,880 A | * | 3/1962 | Anderson .............. | 137/625.33 |
| 3,874,596 A | * | 4/1975 | Baxter ......................... | 239/542 |
| 4,508,138 A | * | 4/1985 | Dixon ...................... | 137/625.3 |
| 4,540,022 A |   | 9/1985 | Cove | |
| 4,796,803 A | * | 1/1989 | Kelley .................... | 137/625.33 |
| 4,893,655 A | * | 1/1990 | Anderson .............. | 137/625.33 |
| 5,024,254 A |   | 6/1991 | Yamagiwa | |
| 5,072,599 A | * | 12/1991 | Simone ....................... | 62/308 |
| 5,490,535 A |   | 2/1996 | Fromm | |
| 6,929,241 B1 | * | 8/2005 | Holloway, Jr. .............. | 251/343 |
| 2002/0096654 A1 | * | 7/2002 | Holloway, Jr. .............. | 251/343 |

FOREIGN PATENT DOCUMENTS

| DE | 512023 | 11/1930 |
|---|---|---|
| EP | 0 714 004 | 5/1996 |

* cited by examiner

*Primary Examiner*—John Fox
(74) *Attorney, Agent, or Firm*—Weingarten, Schurgin, Gagnebin & Lebovici LLP

(57) ABSTRACT

Fluid control apparatus and method of controlling fluid flow. The fluid control apparatus comprises an elongate tube having a first flow opening at an end of the tube and at least one second flow opening along the length of the tube, and a sleeve arranged to slide along said tube during fluid-flow conditions. A gap is present between the tube and the sleeve to allow some fluid to pass through the gap to displace the sleeve from the tube and to allow some flow even when in a fully closed condition. A sleeve positioning device is arranged to adjust the position of the sleeve and thereby control the fluid-flow.

30 Claims, 7 Drawing Sheets

301

Figure 5
Figure 5a
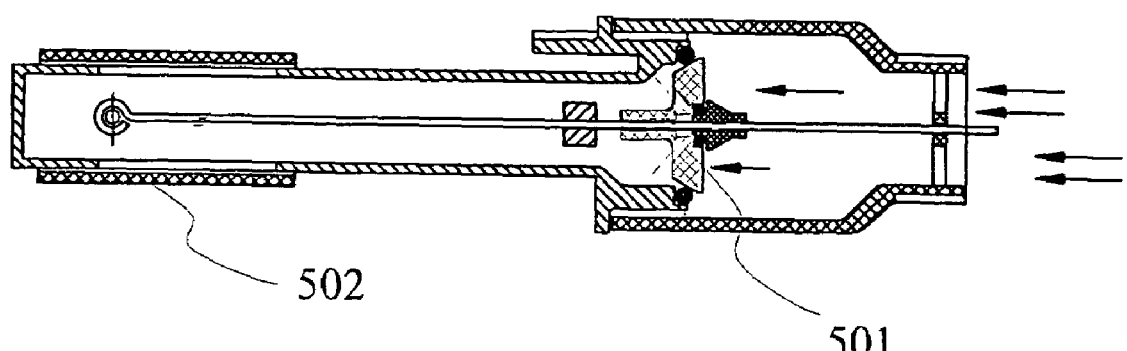
Figure 5b
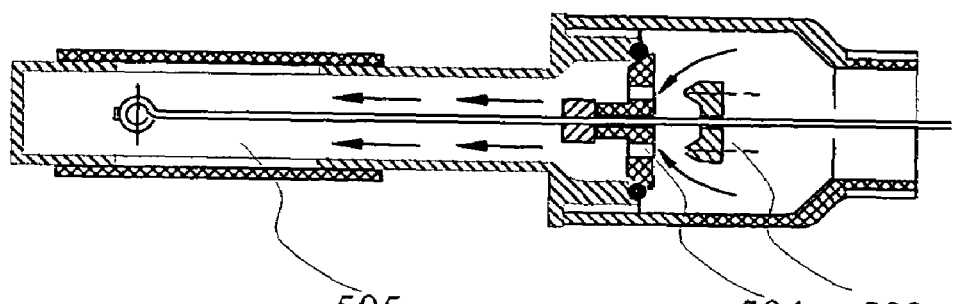
Figure 5c
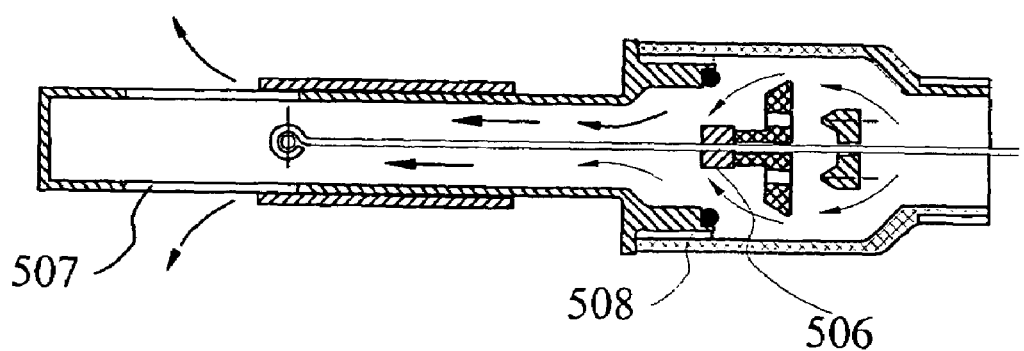

FLUID CONTROL

CROSS-REFERENCE TO RELATED APPLICATIONS

This application claims priority to United Kingdom Patent Application No. 03 24 020.7, filed 14 Oct. 2003, and United Kingdom Patent Application No. 04 05 423.5, filed 11 Mar. 2004, the entire disclosure of which is incorporated herein by reference in their entirety as if fully set forth herein.

BACKGROUND OF THE INVENTION

1. Field of the Invention

The present invention relates to a fluid control device.

2. Description of the Related Art

Valves for controlling the flow of fluid are known. Fluid mixing valves are also known, to mix fluid to desired output flow rate and/or temperature. Australian publication number AU 26307/92 discloses an electronically controlled fluid mixing valve.

BRIEF SUMMARY OF THE INVENTION

According to a first aspect of the present invention there is provided fluid control apparatus, having an elongate tube; a first flow opening at an end of said tube; at least one second flow opening along the length of said tube; a sleeve arranged to slide along said tube during fluid-flow conditions, wherein a gap is present between said tube and said sleeve to allow some fluid to pass through said gap to displace said sleeve from said tube and to allow some flow even when in a fully closed condition; and a sleeve positioning device to adjust the position of said sleeve and thereby control the fluid-flow.

According to a second aspect of the present invention there is provided mixing apparatus for mixing a proportion of a first fluid with a proportion of a second fluid, comprising a first fluid control apparatus and a second control apparatus wherein the sleeve positioning device of said first apparatus co-operates with the sleeve positioning device of said second apparatus such that, as the first apparatus provides an increase in fluid flow, said second apparatus provides a decrease in fluid flow, and vice versa.

According to a third aspect of the present invention there is provided a method of controlling fluid flow, comprising the steps of: supplying fluid to a first flow opening at an end of a tube; receiving said fluid from at least one second flow opening along the length of said tube; and positioning a sleeve arranged to slide along said tube during fluid flow conditions, in which a gap is present between said sleeve and the tube to allow some fluid to pass through said gap to displace said sleeve from said tube and to allow some flow even when in a fully closed condition.

BRIEF DESCRIPTION OF THE SEVERAL VIEWS OF THE DRAWINGS

FIG. 5A illustrates a shut-off valve in a closed condition;

FIG. 5B illustrates a first stage of opening of the valve of FIG. 5A;

FIG. 5C illustrates a second stage of opening of the valve of FIGS. 5A and 5B;

WRITTEN DESCRIPTION OF THE BEST MODE FOR CARRYING OUT THE INVENTION

Figure 1:
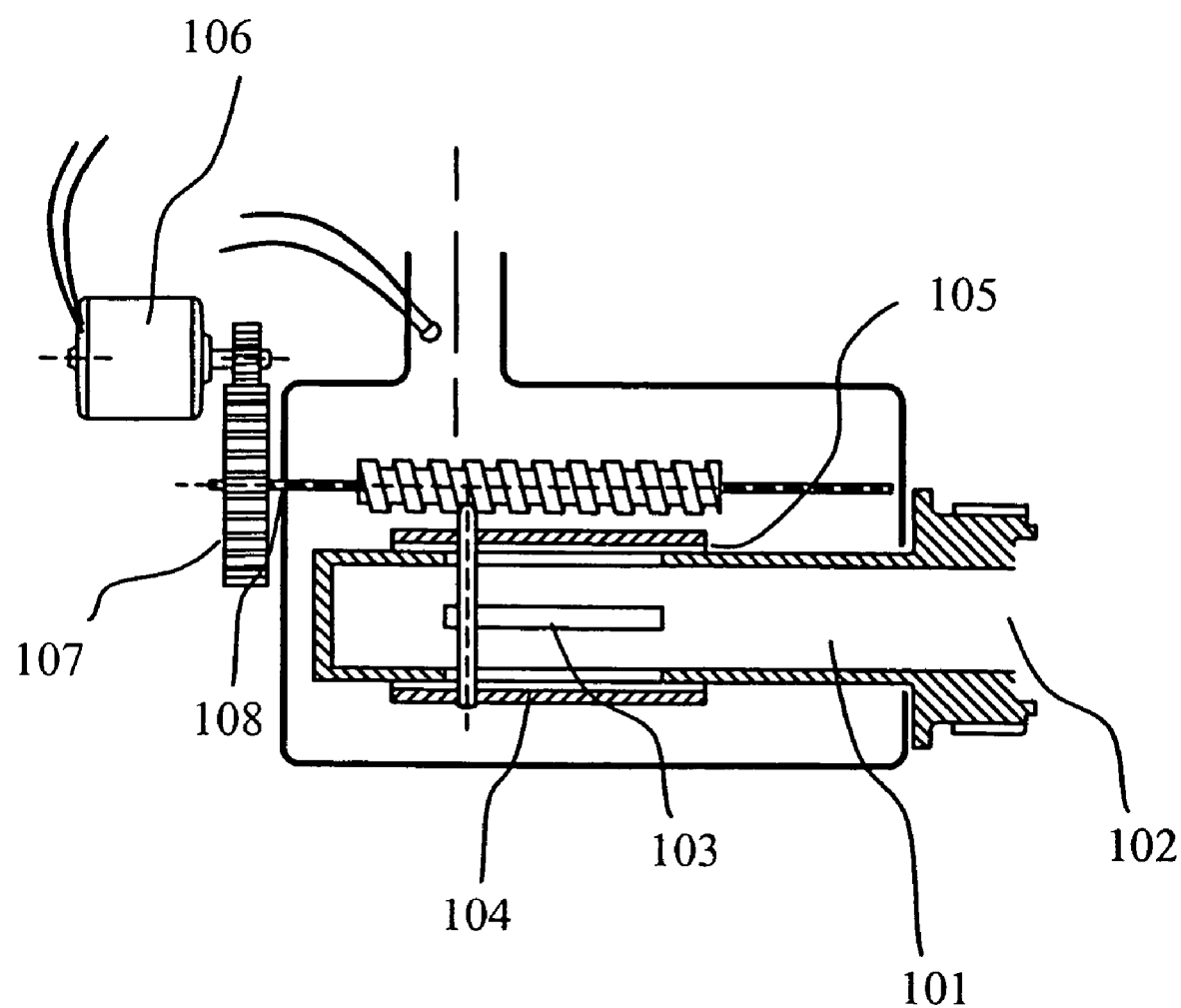
FIG. 1 shows a flow control apparatus.

A fluid control device is shown in FIG. 1. The device includes an elongate tube 101. The elongate tube 101 includes a first flow opening 102 at an end of the tube. In addition, there is provided one or more second flow openings 103 along the length of the tube. In preferred embodiments three or more openings are provided which are preferably substantially equally spaced circumferentially around tube 101. A second flow opening may for example take the form of a longitudinal slit, circular aperture or helix.

To effect fluid flow control, a sleeve 104 is arranged to slide along the tube 101 during fluid flow conditions, that is when fluid is flowing from the first opening 102 out through the second openings 103, or vice versa. The sleeve 104 provides for modulation of fluid flow between a low rate of flow and a high rate of flow.

Between the tube 101 and the sleeve 104 is provided a gap 105. Gap 105 is present so as to allow some fluid to pass through this gap so as to displace the sleeve 104 radially from the tube. In this way fluid is allowed to escape through the gap even when the sleeve 104 is in a fully closed condition; that is to say, portions of the sleeve 104 cover all second openings 103.

During operation, movement of the sleeve is achieved by the provision of a sleeve positioning device arranged so as to position the sleeve 104 and thereby control the degree of fluid flow. In an embodiment, as shown in FIG. 1, the sleeve positioning device includes at least one electric motor 106 and co-operating gears 107. A watertight seal 108 is provided between the motor 106 and gears 107, and a magnetically coupled seal may be used. Use of a reversible motor, which can be operated in both directions, allows the flow through the fluid control device to be increased and decreased using a single motor.

Figure 2:
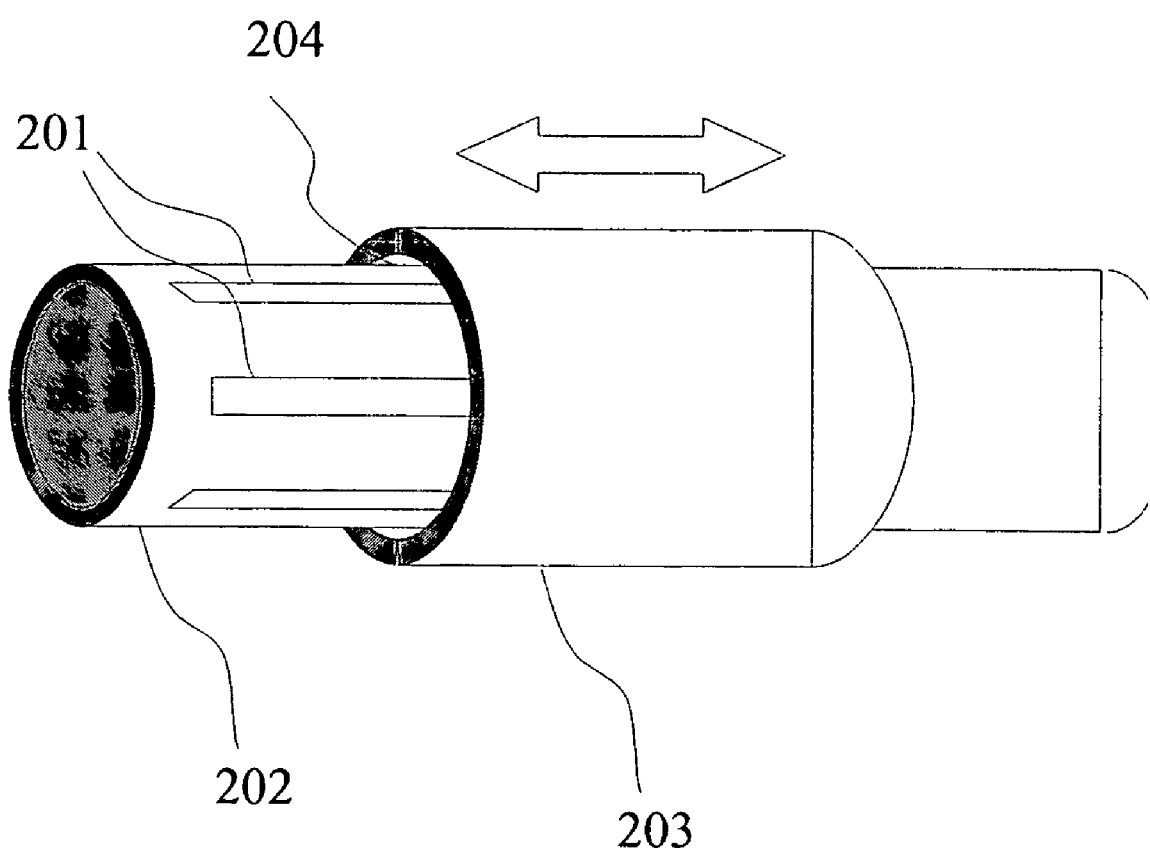
FIG. 2 illustrates an embodiment of flow control apparatus.

FIG. 2 shows an embodiment of fluid control apparatus; for clarity a sleeve positioning device is not shown. A number of second openings 201 are provided along tube 202. Sleeve 203 is arranged to slide along the tube 202 under control during operation whilst fluid is flowing through gap 204 between the tube 202 and the sleeve 203. As the sleeve 203 is moved to increase the degree of cover of the second openings 201, the degree of fluid flow through the second openings 201 decreases. However, when the sleeve 203 is moved into the fully closed position gap 204 allows some fluid flow through the second openings 201, which acts as a lubricant to reduce resistance to the sleeve 203 being moved along the tube 202. This minimising of resistance against positioning of the sleeve enables the use of a motor that draws low levels of power to position the sleeve under high fluid pressure conditions. Balancing of hydrostatic forces in the fluid control apparatus provides for energy savings, and use of some fluid as a lubricant provides for further decreases in energy consumption.

Preferably, the tube and the sleeve of a fluid control device are made from stainless steel, brass, ceramic or other hardwearing material, to avoid pitting (worming). This is of particular relevance to the ends of the tube openings, where fluid may be forced through at high velocity, especially when the device is in the fully closed condition.

Figure 3A:
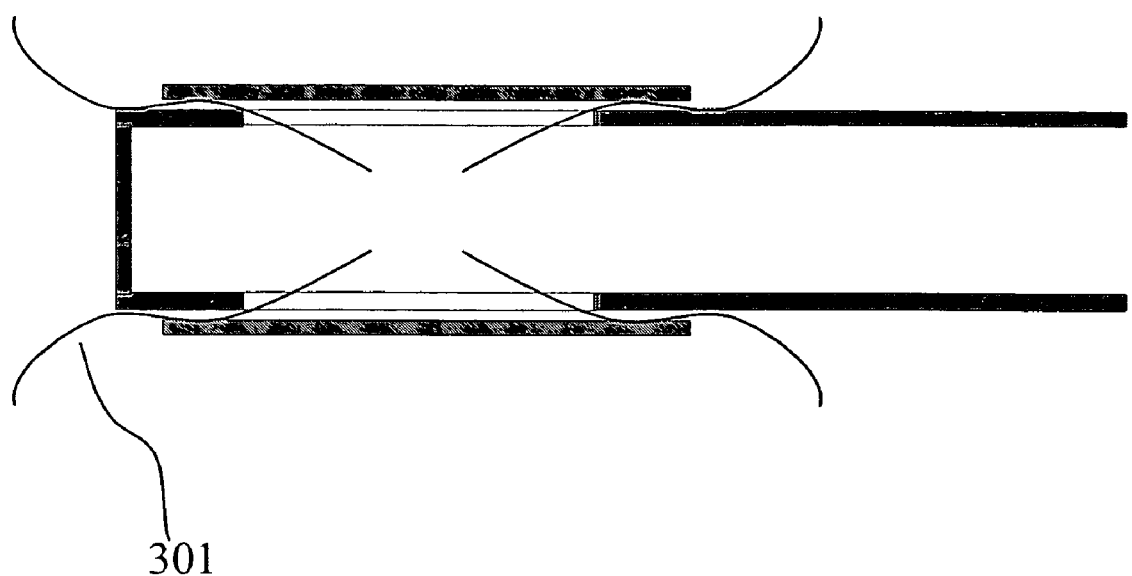
FIG. 3A shows a flow control apparatus with a closed condition.

In FIG. 3A, a flow control device is shown in the fully closed condition, where fluid flow is minimised but not stopped. In this condition, some fluid 301 flows between the tube and the sleeve. This flow allows the sleeve to be moved relative to the tube with low levels of force. Such flow acts to provide frictionless movement of the sleeve through hydraulically balanced fluid flow between the sleeve and the tube. Hydraulic balancing achieved, with respect to the central axis of a tube, is dependent upon the dimensioning and positioning of second openings of the tube.

Figure 3B:
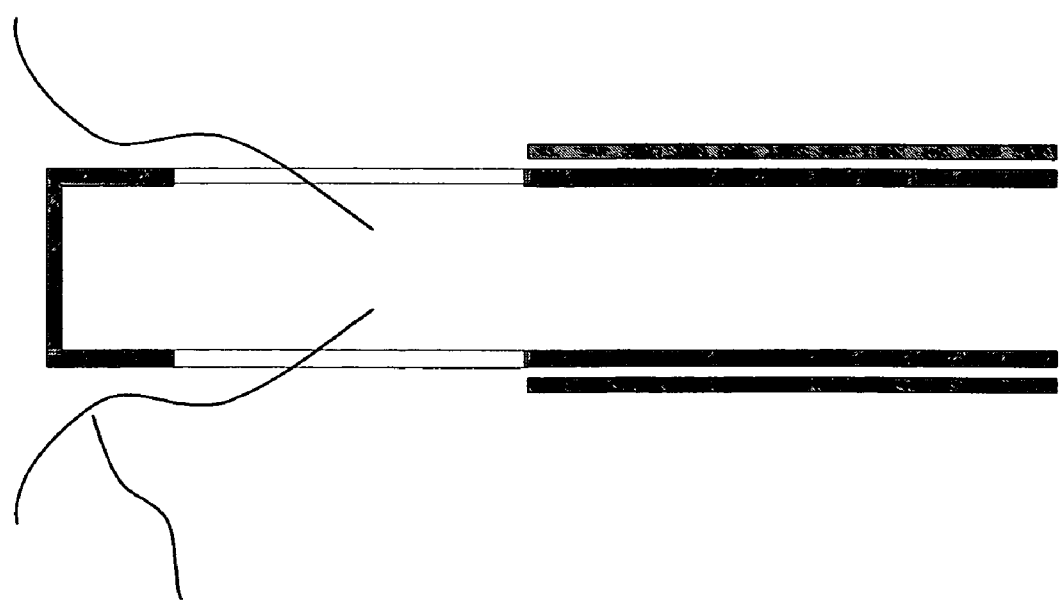
FIG. 3B shows the flow control apparatus of FIG. 3A in an open condition.

The flow control device is shown in an open condition in FIG. 3B, where fluid flow 302 is approaching maximised.

The flow control apparatus allows modulation of fluid flow from a low level to a higher level. Full shut-off of fluid flow may be effected by a separate fluid flow shut-off valve, which in some applications is operatively linked to the flow control device. Preferably, the shut-off valve is provided upstream of the flow control apparatus. A manually operated shut-off valve may be provided.

Figure 4:
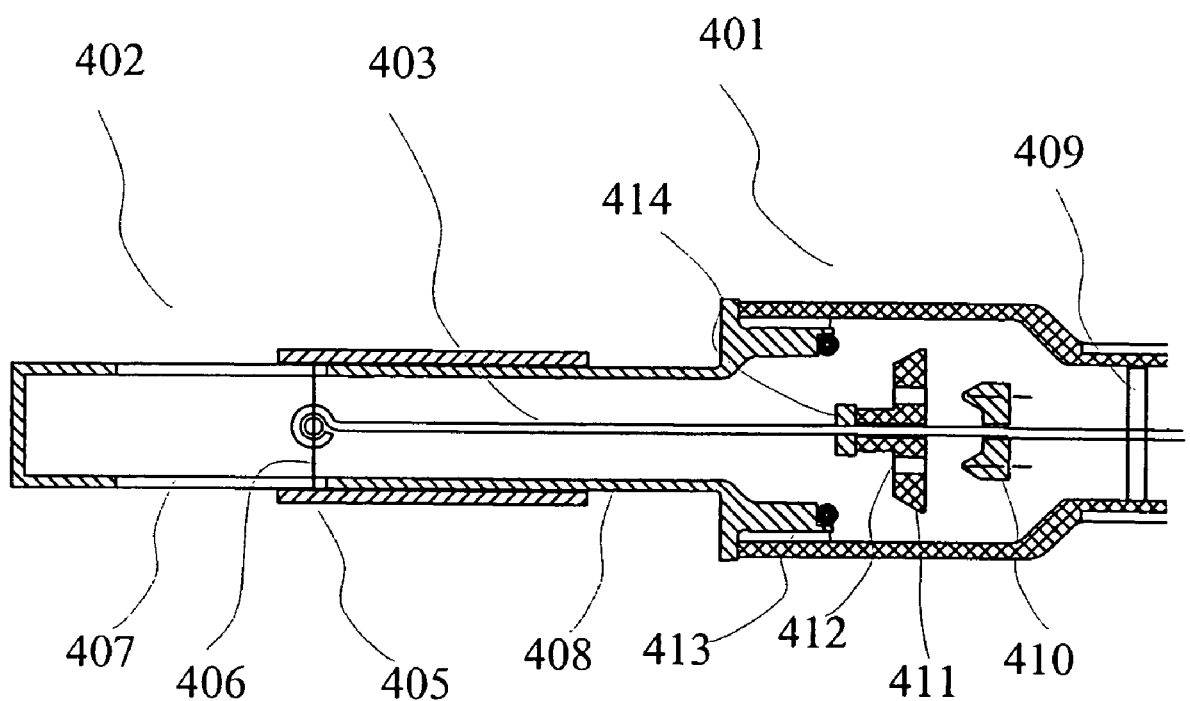
FIG. 4 an embodiment of flow control apparatus.

FIG. 4 shows a preferred fluid control apparatus. A fluid shut-off valve 401 is provided upstream of the fluid flow device 402 that is connected to the fluid flow device 402 by a rod 403. The rod 403 is rigidly attached to the sleeve 405 by a pin 406 passing through second openings 407 of the tube 408. The arrangement of the link is such that movement of the sleeve 405 causes the rod 403 to operate the shut-off valve 401. The rod 403 is held substantially centrally within the valve 401 by a frame structure 409, that provides axial stability, positions the rod 403 to allow it to move freely along the axis of the tube 408 and is configured to allow fluid to enter the valve 401.

The shut-off valve 401 of FIG. 4 is a two-stage operation valve. The rod 403 is fixed to a minor seal 410 that moves in unison with the sleeve 405. The minor seal 410 is shaped so as to act as a small, low area seal that acts on a major seal 411. The major seal 411 floats axially on the rod 403 and is provided with at least one aperture 412. The major seal 411 is shaped to provide a larger seal within the tube 408. The minor seal 410 is shaped to close off the aperture(s) in the major seal 411 to provide a combined seal. Full close off of the valve 401 is effected when the combined seal abuts against a stop surface, in this example provided by toroidal shaped elastomers ('0' ring) 413. A block 414 is fixed to the rod 403 between the major seal 411 and the pin 406, and is located to function as a control device for fluid flow through the valve 401. When the flow control device 402 is in the closed condition there is no contact between the block 414 and the major seal 411, however, during sleeve positioning to open the flow control device 402 the block 414 pushes the major seal 411 away from the stop surface to allow fluid flow through the valve 401. A gap is provided between block 414 and major seal 411 to allow movement of the minor seal 410 without moving the major seal 411.

The fluid control apparatus is configured such that when the valve 401 is closed, the sleeve 405 is in the fully closed condition and no fluid passes through the valve 401 or flow control device 402.

In FIG. 5A, a two stage-operation valve, similar in construction to valve 401, is shown in the closed condition. The fluid acting against both the minor seal 503 and the larger seal 501 is sufficient to retain the seals in the shut position to prevent fluid flow through the valve.

A first stage of opening of the valve is shown in FIG. 5B. The sleeve 502 of the fluid control apparatus is moved towards the valve and this causes the smaller seal 503 to open. The smaller seal 503 has a low surface area against the fluid and therefore a relatively small force is required to open the smaller seal 503. Once the smaller seal 503 is in the open position, fluid flows through the openings of 504 of the larger seal 501 into the tube 505. Some fluid will flow through the gap between the tube 505 and the sleeve 502. This flow will facilitate sleeve positioning through reducing resistance to sleeve movement, however, the leakage rate of this flow is sufficiently low to allow the tube 505 to fill with fluid flowing through the larger seal 504. This flow of fluid into the tube 505 causes the fluid pressure on either side of the larger seal 501 to equalise, enabling the larger seal 501 to be thereafter opened with minimal force.

A second stage of opening of the valve is shown in FIG. 5C. Once the tube 505 is filled with fluid, further movement of the sleeve 502 into the open condition causes block 506 to push against the larger seal 501. Following fluid pressure equalisation on either side of the larger seal 501, the larger seal 501 is lifted into the open position with force until fluid flows through the shut-off valve. Subsequent movement of the sleeve 502 into the open position exposes the second openings 507 of the tube 508, thereby increasing fluid flow through the flow control device. Sleeve positioning can then be effected to modulate the fluid flow through the fluid control device between low flow and high flow.

To shut the fluid flow off, the sleeve 502 is returned to the closed position. This action causes the smaller seal 503 to push against the larger seal 501 to close the gaps 504 in the larger seal 501 and to move the larger seal 501 towards the stop surface provided by 'O' ring 508. When the larger seal 501 contacts the stop surface, the fluid pressure causes both the larger seal 501 and the smaller seal 503 to close tightly, thereby shutting off fluid flow through the fluid control device.

The arrangement of the shut-off valve is such that a higher volume of fluid can flow through the valve with the smaller seal 503 open than through the gap between the tube 505 and the sleeve 502 of the fluid control apparatus.

Figure 6:
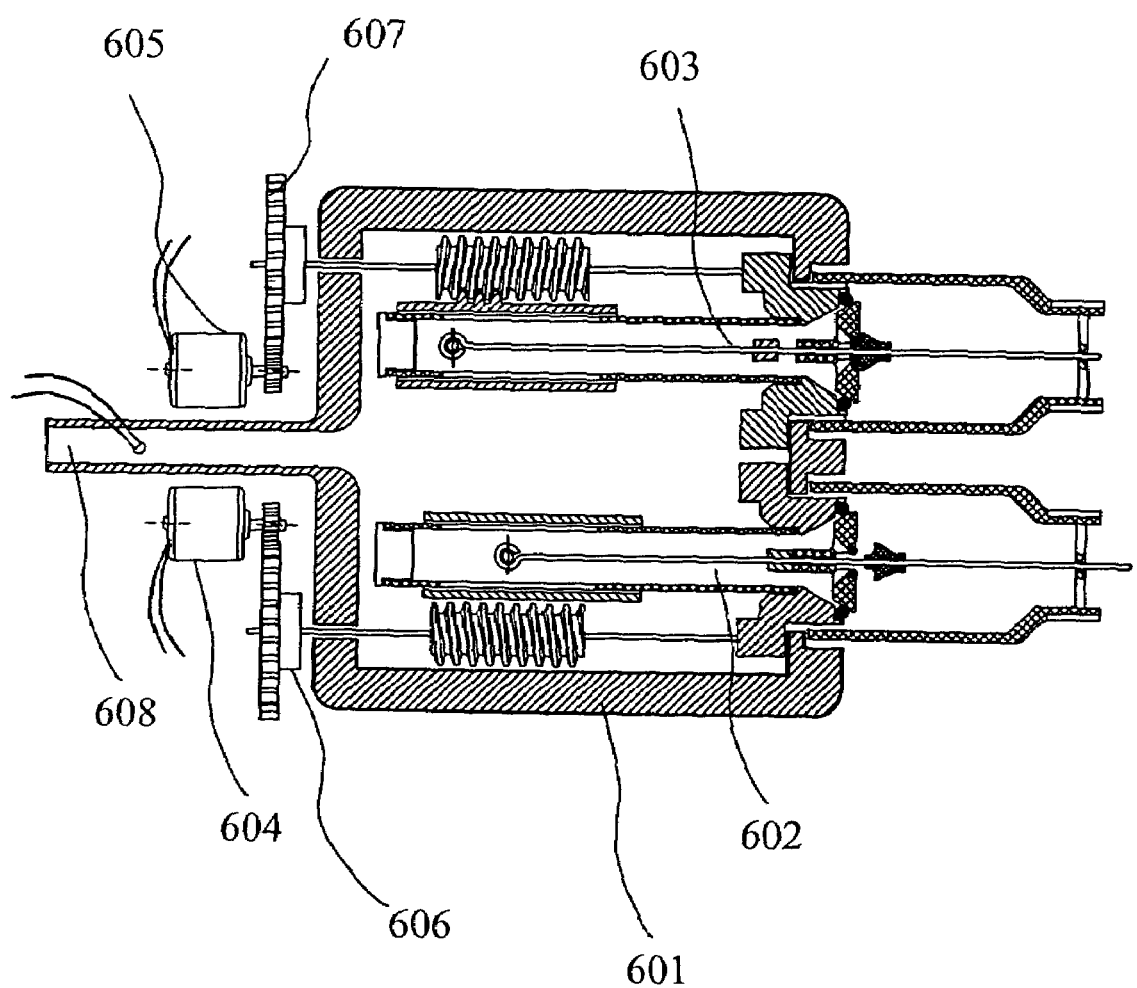
FIG. 6 illustrates a flow control device and shut-off valve embodied in a three port valve.

A flow control device and shut-off valve can be embodied in a three port valve, as illustrated in FIG. 6. In this illustrated example, two fluid control devices, providing two ports, are positioned within a housing 601. In one application, one fluid control device receives hot fluid and the other receives cold fluid. Two fluid controllers 602, 603 are provided, one for each fluid control device, which are arranged to be independently controlled by individual reversible motors 604, 605 and co-operating gears 606, 607 respectively. The fluid controllers 602, 603 allow fluid entering the housing 601 to be mixed to a desired temperature. A third port 608 is provided.

Positioning of a sleeve over its associated tube may be determined by a microprocessor, to provide desired output fluid temperature and/or flow rate, which may be defined by a user or stored in the microprocessor memory. Australian publication number AU 26307/92 describes use of a microprocessor. A thermistor, or mechanical thermostat, positioned downstream of a fluid mixing chamber may be provided, to produce signals for use in achieving and/or maintaining a desired fluid temperature.

Figure 7:
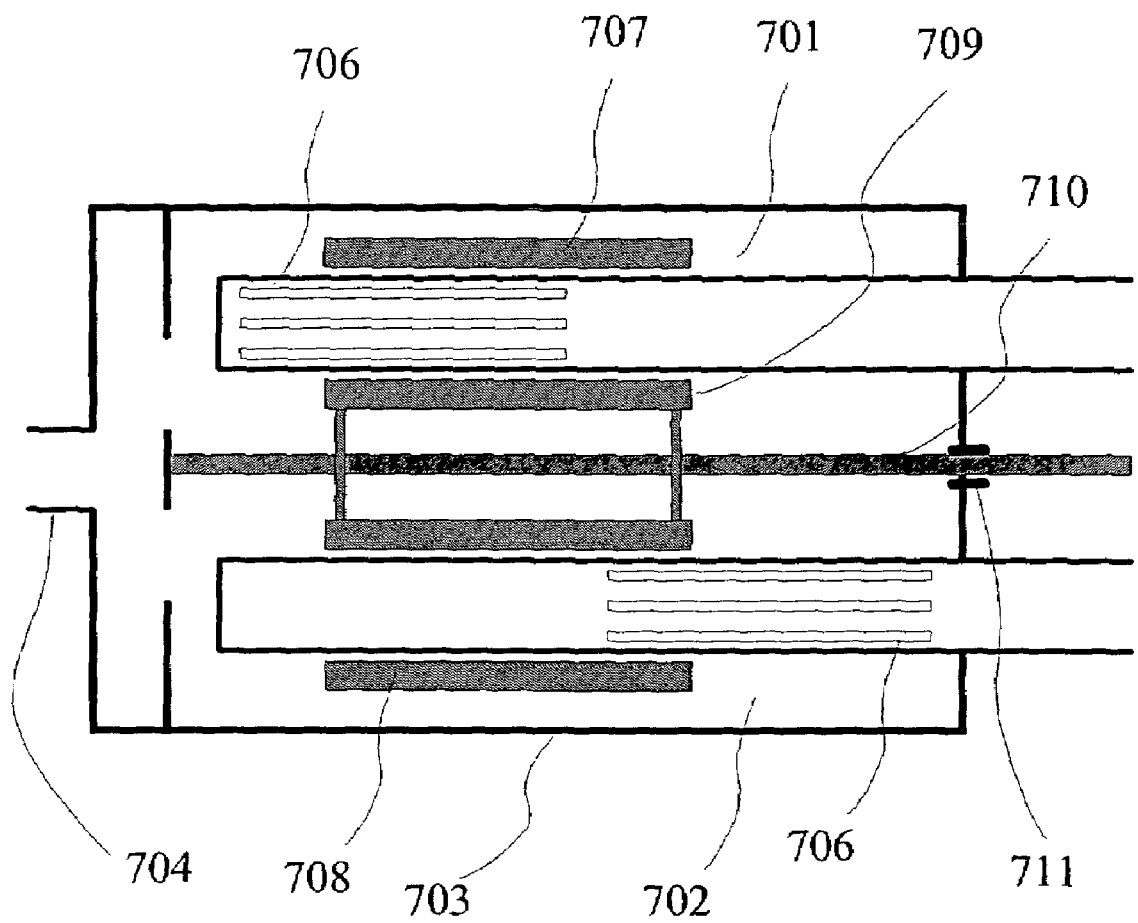
FIG. 7 illustrates an embodiment incorporating two fluid control devices.

FIG. 7 shows an embodiment in which two flow control devices 701, 702 are arranged parallel to each other within a water tight housing 703 having an exit port 704. The tubes of the flow control devices 701, 702 are each provided with openings 705, 706 respectively, and the openings 705, 706 are offset from each other, i.e. they are positionally staggered. The flow control devices 701, 702 are each provided with a sleeve 707, 708 respectively, and the two sleeves 707, 708 are joined together, in this example into a single sleeve block 709. The position of the sleeve block 709 is variable, to vary the position of the sleeves 707, 708 relative to the tubes of the flow control devices 701, 702 respectively in unison, by means of operation of a lead screw 710. The lead screw 710 enters the housing 703 through a seal 711, and provides linear control. In an alternative arrangement, a crank drive may be used. In this example, a single motor is used to control the position of the sleeve block 709, which controls the relative flows of water through the flow control devices 701, 702. This embodiment may be used in a domestic tap or shower application, in which one of the fluid control devices delivers hot water and the other cold water. In an alternative arrangement of flow control devices, the openings are not offset, however the sleeves are offset.

The actual position of the sleeve block 709 may be determined by a microprocessor to provide mixed fluid of a desired output temperature, as defined by a user, or stored in the microprocessor memory.

The example shown in FIG. 7 provides control over mixed fluid temperature, but not flow rate. In addition, a full-shut off valve is not provided. The apparatus of FIG. 7 may however be combined with an additional flow control valve, upstream. Such a valve may take the form of a manually operated gate valve, which can be arranged to provide control of fluid flow through fluid inlet ports and to provide full fluid flow shut-off. Thus, a user may be provided with both electronic and manual fluid control, for example, electronic temperature control and manual flow control. A visual user display may be provided to supply indications of fluid flow settings to a user.

In applications where a flow control device is placed in series with a fluid pump, a controlling microprocessor may be used to initiate the sending of a signal to the pump to turn on, turn off, or to provide an intermediate condition. Preferably, signals are transmitted via a wireless medium, for example by electromagnetic radiation.

In applications of three port housing, use of a low powered motor, or motors, is preferred to control the position of the sleeve relative to the tube of a flow control device. In domestic applications, a three port valve may be operated from a power supply providing a peak power of less then 1000 mW. A fluid control device as described may be used to control fluid flow through a heating system, for example in a radiator or under floor heating element.

What is claimed:

1. Water control apparatus for use in a domestic water system, comprising:
    a water tight housing having an exit port;
    an elongate tube located within said housing;
    a first flow opening at an end of said tube;
    at least one second flow opening along the length of said tube;
    a sleeve arranged to slide along said tube during waterflow conditions, wherein a gap is present between said tube and said sleeve to allow some water to pass through said gap to displace said sleeve from said tube and to allow some flow even when in a fully closed condition; and
    a sleeve positioning device to adjust the position of said sleeve and thereby control the water-flow;
    wherein water is supplied to said first flow opening and exits through said at least one second flow opening into said housing.

2. Apparatus according to claim 1, wherein said tube is substantially cylindrical.

3. Apparatus according to claim 1, wherein a plurality of second flow openings are provided.

4. Apparatus according to claim 3, wherein said second flow openings are longitudinal slits.

5. Apparatus according to claim 1, wherein said sleeve wraps around the outside of said tube.

6. Apparatus according to claim 1, wherein said sleeve wraps around the outside of said tube;
    fluid is supplied to said first flow opening and exits through a plurality of second flow openings; and
    said flow through said second flow openings displaces said sleeve with respect to said tube.

7. Apparatus according to claim 1, including a separate shut-off valve connected to a supply upstream of a said flow opening.

8. Apparatus according to claim 7, wherein, upon opening, said sleeve positioning device is arranged to open said shut-off prior to moving said sleeve.

9. Apparatus according to claim 8, wherein said shut-off valve comprises a small valve component to facilitate pressure equalisation and a large valve component to facilitate volume flow.

10. Apparatus according to claim 9, wherein said sleeve positioning device is arrange to:
    (a) open said small valve component to allow an equalisation of pressure;
    (b) open said large valve component to allow volume flow, including a flow through said gap; and
    (c) adjust the position of said sleeve so as to control fluid flow, in the aforesaid order.

11. Mixing apparatus for mixing a proportion of a first fluid with a proportion of a second fluid, comprising a first fluid control apparatus according to claim 1 and a second control apparatus according to claim 1, wherein the sleeve positioning device of said first apparatus co-operates with the sleeve positioning device of said second apparatus such that, as the first apparatus provides an increase in fluid flow, said second apparatus provides a decrease in fluid flow, and vice versa.

12. Mixing apparatus for mixing a proportion of a first fluid with a proportion of a second fluid comprising a first fluid control apparatus according to claim 1 and a second fluid control apparatus according to claim 1, wherein the sleeve positioning device of the first fluid control apparatus and the sleeve positioning device of the second fluid control apparatus are controllable independently of each other.

13. Mixing apparatus according to claim 11, further comprising a remote fluid pump, wherein mixing is controlled by a microprocessor configured to initiate a signal to said pump to turn on, turn off, or to provide an intermediate condition.

14. Mixing apparatus as claimed in claim 13 wherein said signal is transmitted over a wireless medium.

15. A method of controlling water flow in a domestic water system, comprising the steps of:
    supplying water to a first flow opening at an end of a tube;
    receiving said water from at least one second flow opening along the length of said tube into a housing having an exit port; and
    positioning a sleeve arranged to slide along said tube during water flow conditions, in which a gap is present between said sleeve and the tube to allow some water to pass through said gap to displace said sleeve from said tube and to allow some flow even when in a fully closed condition.

16. A method according to claim 15, including the step off shutting off the flow of fluid by means of a separate shut-off valve.

17. A method according to claim 15, wherein said shut-off valve is operated in two stages, wherein a first stage facilitates pressure equalisation and a second stage facilitates fluid flow.

18. A method according to claim 15, in which a sleeve positioning device is configured to perform steps when initiating a fluid flow, comprising:
   opening a small valve component to allow an equalisation of pressure;
   opening a large valve component to allow volume flow including flow through said gap; and
   adjusting the position of said sleeve so as to control the flow of fluid.

19. A method of mixing hot water with cold water to produce a flow of warm water for washing purposes, comprising the steps of
   supplying hot water to a first flow opening at an end of a first tube;
   receiving said hot water from at least one flow opening along the length of said first tube;
   supplying cold water to a first flow opening at an end of a second tube;
   receiving said cold water from at least one flow opening along the length of said second tube, whereupon said received hot water mixes with said received cold water; and
   positioning a first sleeve arranged to slide along said first tube in combination with the positioning of a second sleeve arranged to slide along said second tube, in which gaps are present between each said sleeve and its respective tube allowing some water to pass through said gap to displace each sleeve from its respective tube even when in a fully closed condition.

20. Water control apparatus according to claim 1, wherein said sleeve positioning device comprises a lead screw which enters said water tight housing through a seal.

21. Water control apparatus according to claim 1, wherein said sleeve positioning device comprises a crank drive.

22. Water control apparatus according to claim 1, further comprising a rod for providing a link to a shut-off valve, said rod extending through said tube and attached to said sleeve such that movement of said sleeve causes movement of said rod, whereby said sleeve positioning device is arranged to move said sleeve and to move said rod for operation of a shut-off valve.

23. Water control apparatus according to claim 1, further comprising:
   a pin attached to said sleeve and passing through second flow openings of said tube; and
   a rod for providing a link to shut-off valve, said rod extending through said tube and attached to said sleeve by said pin such that movement of said sleeve causes movement of said rod;
   wherein said sleeve positioning device is arranged to move said sleeve and to move said rod for operation of a shut-off valve.

24. A method according to claim 15, wherein said water is supplied to a first flow opening at an end of a cylindrical tube.

25. A method according to claim 15, wherein water is received from a plurality of second flow openings along the length of said tube.

26. A method according to claim 15, wherein said second flow openings are longitudinal slits.

27. A method according to claim 15, wherein said sleeve is positioned around the outside of said tube.

28. A method according to claim 15, wherein said sleeve is positioned by operating a lead screw which enters said water tight housing through a seal.

29. A method according to claim 15, wherein positioning said sleeve causes movement of a rod, attached to said sleeve, for the operation of a shut-off valve.

30. A method according to claim 15, wherein positioning said sleeve causes movement of a rod, which extends through said tube and is attached to said sleeve by a pin passing through second flow openings of said tube, for the operation of a shut-off valve.

* * * * *